United States Patent
Wright (10) Patent No.: US 9,333,925 B2
(45) Date of Patent: May 10, 2016

(54) CLEAR POCKET THAT ATTACHES TO AN AUTOMOBILE STEERING WHEEL FOR HOLDING ELECTRONIC AND NON ELECTRONIC ITEMS

(71) Applicant: Paul A Wright, Bremerton, WA (US)

(72) Inventor: Paul A Wright, Bremerton, WA (US)

(*) Notice: Subject to any disclaimer, the term of this patent is extended or adjusted under 35 U.S.C. 154(b) by 103 days.

(21) Appl. No.: 14/162,131

(22) Filed: Jan. 23, 2014

(65) Prior Publication Data

US 2014/0131403 A1    May 15, 2014

Related U.S. Application Data

(63) Continuation-in-part of application No. 13/461,784, filed on May 2, 2012, now abandoned.

(51) Int. Cl.
  *B60R 11/00* (2006.01)
  *B60R 11/02* (2006.01)

(52) U.S. Cl.
  CPC ........... *B60R 11/02* (2013.01); *B60R 2011/001* (2013.01); *Y10T 29/49826* (2015.01)

(58) Field of Classification Search
  CPC .................................. B60N 3/005; B60R 7/04
  USPC ......... 224/276, 929, 420, 275, 277, 572, 584, 224/563, 928; 2/49.1; 383/22; 206/37, 38, 206/320
  See application file for complete search history.

(56) References Cited

U.S. PATENT DOCUMENTS

| | | | |
|---|---|---|---|
| 2,810,221 A | 10/1957 | Reifsnyder | |
| 3,643,606 A | 2/1972 | Vise | |
| 3,654,629 A * | 4/1972 | Crisman et al. | 2/49.1 |
| 4,243,249 A | 1/1981 | Goss | |
| 4,287,621 A | 9/1981 | Kertz | |
| 4,375,881 A | 3/1983 | Mitchell | |
| 4,453,788 A | 6/1984 | Russell | |
| 4,663,779 A * | 5/1987 | Bible | 2/49.3 |
| 4,890,559 A | 1/1990 | Martin | |
| 4,974,805 A * | 12/1990 | Douglas | 248/447.1 |
| 5,056,822 A | 10/1991 | Shim | |
| 5,193,777 A | 3/1993 | Faustich | |
| 5,385,283 A | 1/1995 | Shioda | |
| 5,386,785 A | 2/1995 | Naor | |
| D358,612 S | 5/1995 | Smith | |
| 5,413,035 A | 5/1995 | Fernandez | |
| 5,558,026 A | 9/1996 | Siebert | |
| 5,662,047 A | 9/1997 | Metcalf | |
| 5,749,305 A | 5/1998 | Jacovelli | |
| 5,749,306 A | 5/1998 | Breuner | |

(Continued)

*Primary Examiner* — Justin Larson
*Assistant Examiner* — Phillip Schmidt
(74) *Attorney, Agent, or Firm* — Lambert Patent Services; K Karel Lambert (57) ABSTRACT

A portable, foldable, one-piece device that attaches to an automobile steering wheel as a holder for a variety of electronic or non-electronic devices. A clear vinyl pocket can hold notebook computers, electronic reading devices, fire and police command boards, clipboards, books, newspapers, phone lists, while keeping them completely visible. The durable, single piece, washable construction has no moving parts. It can be folded and easily stored on the visor of a vehicle. Hook and loop fastener strips may be sewn to the device for added utility. Accessories may be temporarily affixed to these fasteners: such as writing utensils, note pads, lights, pictures, or other personal or work related items. A small pocket is sewn alongside the larger clear pocket for storage if desired. The device can be mounted to the passenger side dash with additional fasteners.

4 Claims, 8 Drawing Sheets

(56) References Cited

U.S. PATENT DOCUMENTS

| | | |
|---|---|---|
| 5,845,585 A | 12/1998 | Meeus |
| 6,038,983 A | 3/2000 | Lendl |
| 6,062,145 A * | 5/2000 | Lin ................................. 108/44 |
| 6,148,738 A | 11/2000 | Richter |
| 6,279,800 B1 | 8/2001 | Lee |
| 6,321,912 B1 * | 11/2001 | Lippert et al. ................ 206/576 |
| 6,408,769 B1 | 6/2002 | Lewis |
| 6,412,425 B1 | 7/2002 | Chen |
| 6,457,421 B1 | 10/2002 | Apichom |
| 6,494,148 B1 | 12/2002 | Mullaney |
| 7,017,878 B2 | 3/2006 | Guo et al. |
| 7,093,545 B2 | 8/2006 | Twyford |
| 8,079,312 B2 | 12/2011 | Long |
| 2002/0194946 A1 | 12/2002 | Jackson |
| 2004/0083930 A1 | 5/2004 | Han |
| 2004/0144196 A1 | 7/2004 | Thomas |
| 2004/0205876 A1 * | 10/2004 | Bruffett ........................... 2/49.2 |
| 2005/0193925 A1 | 9/2005 | Wesolek |
| 2006/0032410 A1 | 2/2006 | Miller |
| 2006/0107878 A1 | 5/2006 | Cassata |
| 2007/0251963 A1 | 11/2007 | Lin |
| 2008/0257228 A1 | 10/2008 | Chisler |
| 2010/0044259 A1 * | 2/2010 | Wang ............................ 206/320 |
| 2010/0089779 A1 | 4/2010 | Bowers |
| 2012/0080465 A1 | 4/2012 | Son |

\* cited by examiner

Fig. 5A
PLAN VIEW

Fig. 5B

TOP ELEVATION VIEW

Fig. 5C

SIDE ELEVATION VIEW

CLEAR POCKET THAT ATTACHES TO AN AUTOMOBILE STEERING WHEEL FOR HOLDING ELECTRONIC AND NON ELECTRONIC ITEMS

CROSS REFERENCE TO RELATED APPLICATIONS

This application is a continuation-in-part of U.S. patent application Ser. No. 13/461,784, filed 2 May 2012; said patent document being incorporated herein in entirety for all purposes by reference.

GOVERNMENT SUPPORT

Not Applicable.

FIELD OF THE INVENTION

This invention relates to steering wheel supported devices that support work and/or personal items for use when the vehicle is not in motion.

BACKGROUND

New technologies in computers and electronic reading devices have created flat touch screen designs. Invoice books, clip boards, police and fire command boards also have a flat surface for working that is most conveniently used when held up off the lap of the user. Previous steering wheel devices have created tables for laptop computer use and or storage pockets designed for storage and not for utility. While some previous designs are more suited for use as a table or full computer workstation, the storage devices have been, relatively large, complex, heavy and prone to malfunction.

Trends in the fire service, and other emergency response organizations, are moving incident command to the interior of response vehicles. While most police and fire vehicles have computers installed in the vehicle, a need exists to organize command functions on a separate device. This invention meets the need of supporting many of the tools currently used to meet this function.

The following Patents have been identified as supporting devices for use on steering wheels. None were found to operate with the functionality, size, flexibility, and simplicity of the invention being currently described. US20120080465A1 to Jae S. Son Apr. 5, 2012, US20080257228A1 to Joel and Mary Jo Chisler Oct. 23, 2008, US20070251963A1 to Chien-Hsing Lin Nov. 1, 2007, US20060107878A1 to Michael Cassata May 25, 2006, US20050193925A1 to James Wesolek Sep. 8, 2005, U.S. Pat. No. 7,017,878 to James Guo, Wendy Zang Mar. 28, 2006, US20040083930A1 to Kyu Hyun Han May 6, 2004, US20020194946A1 to Crystal Jackson Dec. 26, 2002, U.S. Pat. No. 6,050,201 to David k. Blanchard, James W. Blanchard Jr. Apr. 18, 2000, U.S. Pat. No. 5,385,283 to Yoshihiko Shioda Jan. 31, 1995, U.S. Pat. No. 5,193,777 to Eugene W. Faulstich, U.S. Pat. No. 5,056,822 to Henry H. Shim Oct. 15, 1991, U.S. Pat. No. 4,375,881 to Stephen A. Mitchell Mar. 8, 1983, U.S. Pat. No. 4,287,621 to Charles A. Kurtz Sep. 8, 1981, U.S. Pat. No. 4,243,249 to H. Calvin Goss Jan. 6, 1981, U.S. Pat. No. 2,810,221 to S. E. Reifsnyder Oct. 22, 1957, U.S. Pat. No. 8,079,312 Sep. 30, 2008, US20060032410A1 Aug. 10, 2004, U.S. Pat. No. 7,093,545 Oct. 8, 2003, US20040144196A1 Jan. 29, 2003, U.S. Pat. No. 6,494,148 Jul. 10, 2001, U.S. Pat. No. 6,457,421 May 23, 2001, U.S. Pat. No. 6,408,769 Feb. 5, 2001, U.S. Pat. No. 6,412,425 Dec. 12, 2000, U.S. Pat. No. 6,279,800 Mar. 22, 2000, U.S. Pat. No. 6,148,738 Sep. 13, 1999, U.S. Pat. No. 036,158 Aug. 28, 1998, U.S. Pat. No. 6,038,983 Aug. 25, 1997, U.S. Pat. No. 5,845,585 Jun. 19, 1997, U.S. Pat. No. 6,126,197 Apr. 24, 1997, U.S. Pat. No. 5,749,306 Nov. 26, 1996, U.S. Pat. No. 5,662,047 Sep. 23, 1996, U.S. Pat. No. 5,749,305 Jul. 16, 1996, U.S. Pat. No. 5,558,026 Sep. 12, 1994, U.S. Pat. No. 5,413,035 Sep. 13, 1993, U.S. Pat. No. 5,386,785 Jul. 22, 1992, U.S. Pat. No. 4,890,559 Jan. 17, 1989, U.S. Pat. No. 4,453,788 Jul. 16, 1981, U.S. Pat. No. 4,375,881 Jan. 23, 1981, U.S. Pat. No. 3,643,606 Jun. 25, 1970. Also of possible relevance is U.S. Pat. No. 8,479,961 to Schneidau, U.S. Des Pat. No. D358,612 to Smith, and US Pat Appl Publ No. US2010/0089779 to Bowers.

However, no product has fully satisfied the problem and needs of working in a vehicle or been directed to the needs of emergency responders. These and other issues are addressed by the inventive steering wheel pocket devices disclosed here.

SUMMARY

This invention will support a variety of work or personal items while attached to the steering wheel of a non-moving vehicle. The clear pocket allows for full viewing of the entire object being supported. The sheet material used allows for reading and use of the touch screen and mouse pad functions of most electronic devices as well as use with a rigid board such as a marking board. The lightweight, durable design lends itself to easy storage on the visor of the automobile or to be carried conveniently in a pocket or purse. It is fully washable.

In a first embodiment, the invention is a steering wheel pocket device for holding electronic and non electronic devices selected from notebook computers, electronic reading devices, books, police and fire command boards, clipboards, invoice books, writing implements, flashlights, and/or magazines on a steering wheel while the vehicle is not in motion, which comprises (a) a body member formed of a rip-resistant sheet, the body member having a top edge, a bottom edge, a front face, a back face, and two sides, wherein the body member is divided by a steering wheel mounting slit extending from side to side into a support webbing proximate to the top and an apron extending from the slit to the bottom, the support webbing and the apron joining at the sides to enclose the mounting slit; (b) an optically clear sheet member affixed to the front face of the body member at the bottom edge, the the clear sheet member defining a pocket having at least one opening at the top of the pocket; (c) such that the steering wheel mounting slit is dimensioned to detachably hang the body member on a steering wheel and the pocket is dimensioned to receive on or more objects selected by a user when working in a vehicle. The body member is composed of a flexible, foldable and tear-resistant plastic having essentially no elasticity. The optically clear sheet member is composed of a flexible, foldable and tear-resistant plastic having a thickness and thermal conductivity enabling operation of a capacitive or touch sensitive screen through the sheet member. In a preferred embodiment, the clear pocket is formed of vinyl sheet having a 0.030 (30 gage) thickness. Other embodiments and methods of use are also disclosed.

BRIEF DESCRIPTION OF THE DRAWINGS

The teachings of the present invention are more readily understood by considering the drawings, in which.

The drawing figures are not necessarily to scale. Certain features or components herein may be shown in somewhat schematic form and some details of conventional elements may not be shown in the interest of clarity, explanation, and conciseness. The drawing figures are hereby made part of the specification, written description and teachings disclosed herein.

NOMENCLATURE AND DEFINITIONS

Certain terms are used throughout the following description to refer to particular features, steps or components, and are used as terms of description and not of limitation. As one skilled in the art will appreciate, different persons may refer to the same feature, step or component by different names. Components, steps or features that differ in name but not in structure, function or action are considered equivalent and not distinguishable, and may be substituted herein without departure from the invention. Certain meanings are defined here as intended by the inventors, i.e., they are intrinsic meanings. Other words and phrases used herein take their meaning as consistent with usage as would be apparent to one skilled in the relevant arts. The following definitions supplement those set forth elsewhere in this specification.

VELCRO® refers to a proprietary fastener system having a first surface of hooks and a second surface of loops, as is known in the art, and is generically described here as a "hook-and-loop" fastener system. "Fastener system" may refer more generally to any reversibly adhering or attaching system such as a pressure sensitive glue or snap rivets. Preferred fastener systems are used to reposition tokens or tagged pieces on a board or on the sides of the pocket device.

General connection terms including, but not limited to "connected," "attached," "conjoined," "secured," "adherent" and "affixed" are not meant to be limiting, such that structures so "associated" may have more than one way of being associated.

Relative terms should be construed as such. For example, the term "front" is meant to be relative to the term "back," the term "upper" is meant to be relative to the term "lower," the term "vertical" is meant to be relative to the term "horizontal," the term "top" is meant to be relative to the term "bottom," and the term "inside" is meant to be relative to the term "outside," and so forth. Unless specifically stated otherwise, the terms "first," "second," "third," and "fourth" are meant solely for purposes of designation and not for order or for limitation. Reference to "one embodiment," "an embodiment," or an "aspect," means that a particular feature, structure, step, combination or characteristic described in connection with the embodiment or aspect is included in at least one realization of the present invention. Thus, the appearances of the phrases "in one embodiment" or "in an embodiment" in various places throughout this specification are not necessarily all referring to the same embodiment and may apply to multiple embodiments. Furthermore, particular features, structures, or characteristics of the invention may be combined in any suitable manner in one or more embodiments.

It should be noted that the terms "may," "can," and "might" are used to indicate alternatives and optional features and only should be construed as a limitation if specifically included in the claims. The various components, features, steps, or embodiments thereof are all "preferred" whether or not it is specifically indicated. Claims not including a specific limitation should not be construed to include that limitation. The term "a" or "an" as used in the claims does not exclude a plurality.

"Conventional" refers to a term or method designating that which is known and commonly understood in the technology to which this invention relates.

Unless the context requires otherwise, throughout the specification and claims that follow, the term "comprise" and variations thereof, such as, "comprises" and "comprising" are to be construed in an open, inclusive sense—as in "including, but not limited to."

The appended claims are not to be interpreted as including means-plus-function limitations, unless a given claim explicitly evokes the means-plus-function clause of 35 USC §112 para (f) by using the phrase "means for" followed by a verb in gerund form.

A "method" as disclosed herein refers to one or more steps or actions for achieving the described end. Unless a specific order of steps or actions is required for proper operation of the embodiment, the order and/or use of specific steps and/or actions may be modified without departing from the scope of the present invention.

DETAILED DESCRIPTION

Figure 1:
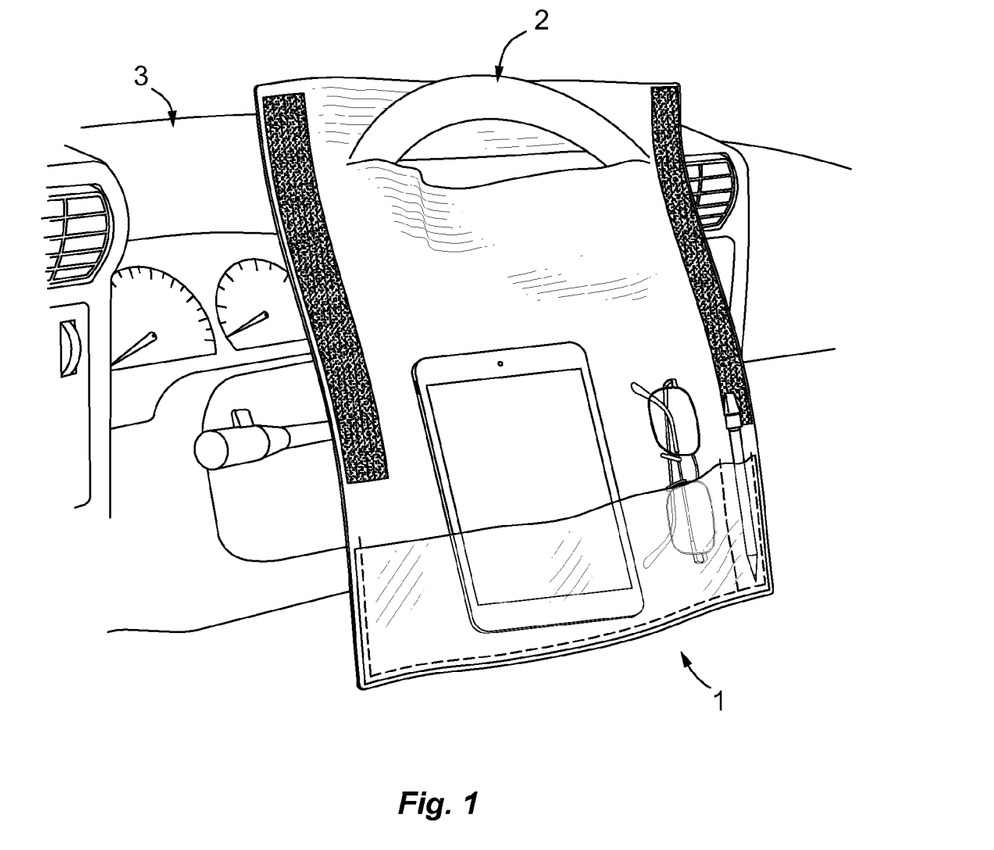
FIG. 1 is a rendering of a steering wheel pocket device mounted in a vehicle and displaying the front side and exemplary uses for the pocket or pockets.

Turning to the figures, FIG. 1 is a rendering of a steering wheel pocket device (1) mounted in a vehicle and displaying the front side and exemplary uses for the pocket or pockets. Shown for reference is the steering wheel (2) and dashboard (3) of the vehicle. The device includes an apron extending over the steering wheel and is held in place by a mounting slit through which the steering wheel protrudes. The lower lip of the apron includes a clear pocket for organizing items for ready access. Exemplary uses include provision for using an electronic device with touch screen, and for storing a pair of glasses and a writing implement or computer stylus. The device provides a flexible workspace that can be folded and put away when not in use.

Figure 2:
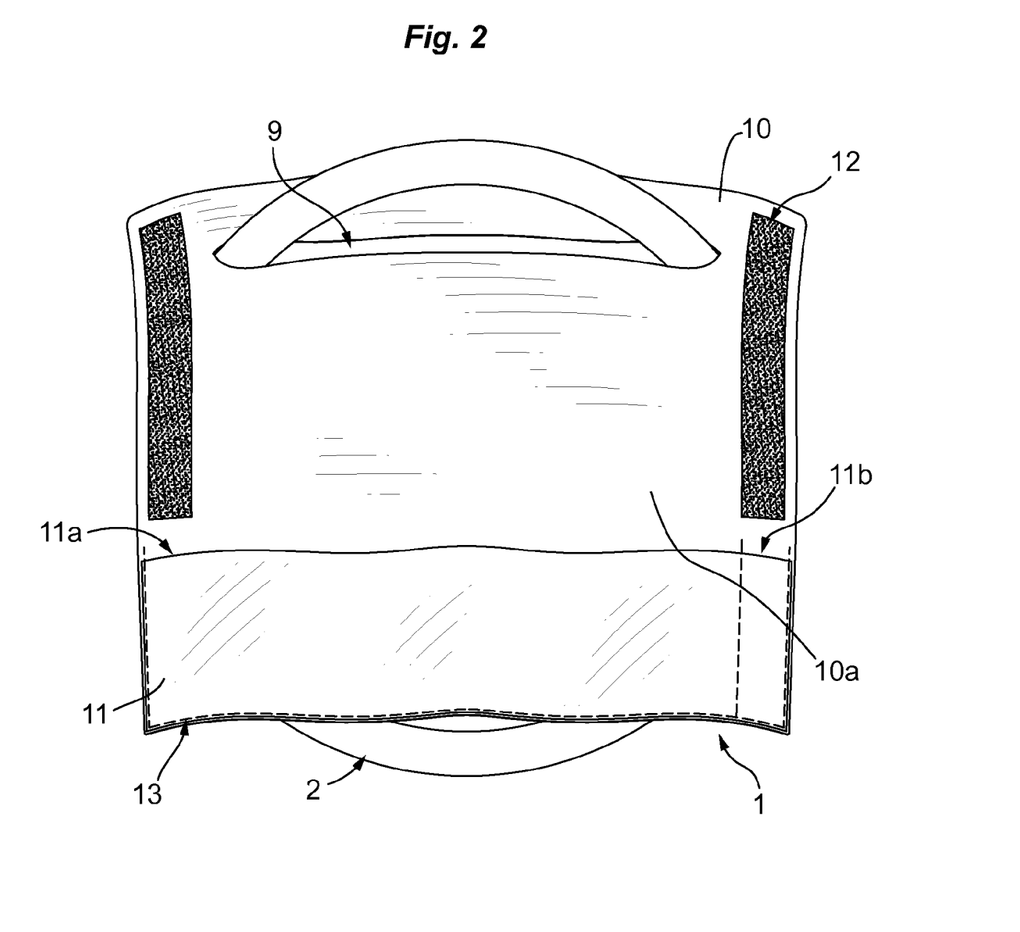
FIG. 2 is a perspective view of front of the device showing the steering wheel in mounting slit.

FIG. 2 is a perspective view of front of a first device of the invention (1), showing the steering wheel (2) in mounting slit or "opening" (9). A backing layer or "main body" (10) includes a top and a bottom and two sides, and defines a flexible bib or apron (10a) that extends from the mounting slit to the bottom. A clear pocket (11) is stitched (13) to the backing layer proximate to the bottom edge. The material used for the main body (10) may have an about 80 pound rip strength and a very low stretch factor. With experimentation, it can be made of a variety of other tear-resistant and foldable materials that are inelastic and dimensionally stable. In working with the preferred vinyl material, ultrasonic or RF welding is also an option for attaching the pocket to the backing layer.

The clear pocket is open at the top for receiving one or more articles selected by a user. The clear pocket attachment (11) provides a strong holding base for any object to be held to the steering wheel. As illustrated here, the clear pocket is divided into a larger pocket (11a) and a smaller pocket (11b) such as useful for a tablet and a writing implement, for example. The see-through quality of the pocket allows for reading of materials placed into the pocket. Surprisingly, by adjusting the thickness and durometer of the clear pocket sheet material, manipulation of mouse pads, keyboards, and capacitive or touch-sensitive screen features of electronic devices is enabled.

The clear vinyl is stitched to create a smaller pocket (11b) for holding writing instruments, computer stylus, pen light, or any number of personal accessories. A strip of fastener material (12) runs along each side, left and right, to build in utility, personalization, alternate suspension methods, and specific storage for fire department command functions, for example. The fastener system may be sewn on for durability and washability or conveniently may be glued in place using a flexible glue.

Figure 3:
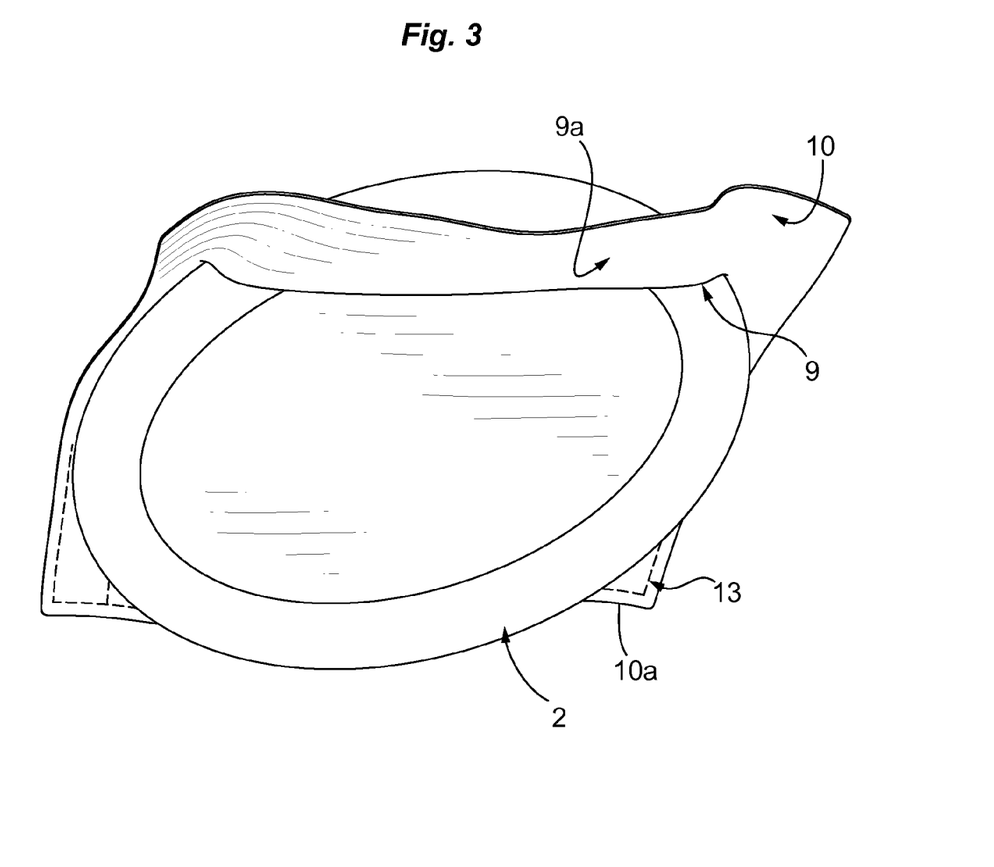
FIG. 3 is a perspective view of the back of the device with steering wheel in mounting slit.

FIG. 3 is a perspective view of the back of the device with steering wheel in mounting slit (9). The body segment above the mounting slit forms a superiorly-placed mounting band or "webbing" (9a) that slips over the steering wheel (2) to secure the device and prevent it from slipping into the user's lap. By selecting a tear-resistant material to form the mounting slit and webbing, the device will withstand rough use without being torn from the wheel. Materials for the clear pocket and stitching are also selected for durability and strength. Stitching (13) for the clear pocket is visible at the lower corners of the apron (10a) of the main body layer (10). In this example, the pocket is supported by the lower aspect of the steering wheel.

Figure 4:
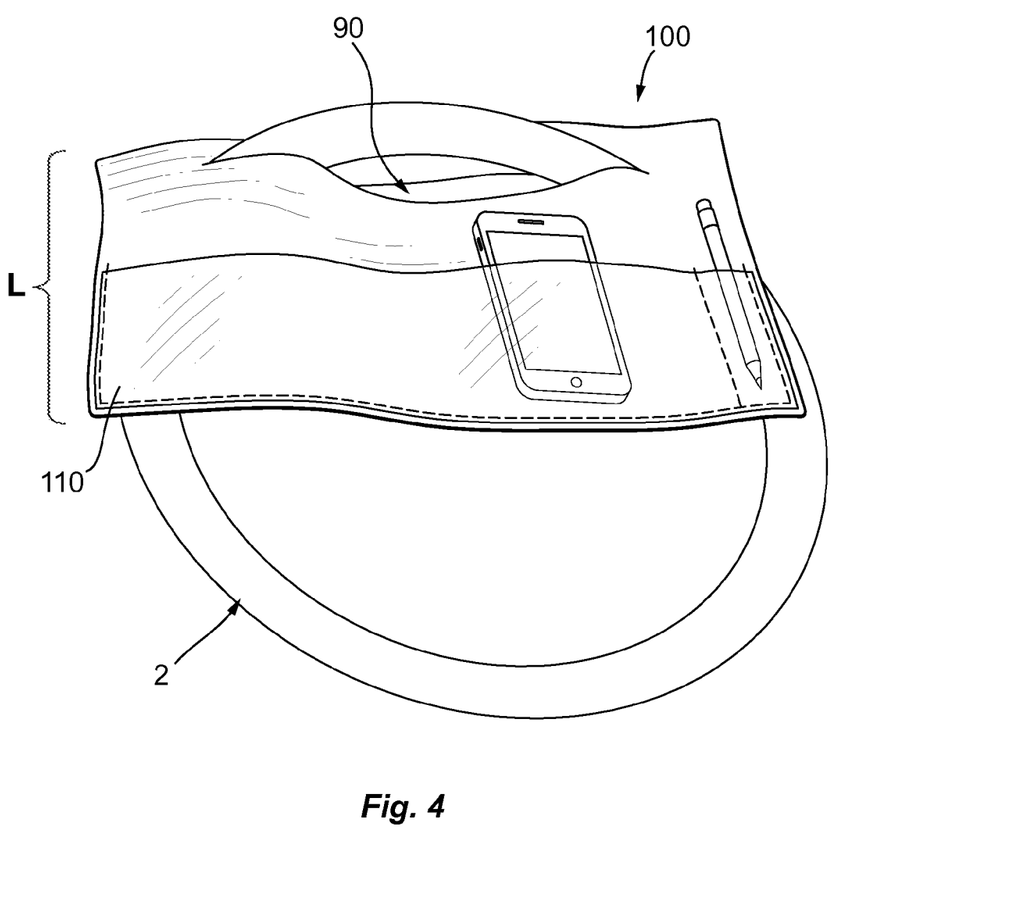
FIG. 4 is a rendering of a second embodiment having a shorter apron.

FIG. 4 is a rendering of a second embodiment (100) having a shorter apron. The body includes a clear pocket (110) at the lower edge of the apron and a mounting slot (90) for securing the device on the steering wheel (2) of a vehicle. Shown here are typical items to be placed in the clear pocket for ready reference and convenient availability when working from a vehicle. Length "L" may be formed to suit particular applications, but is shown here at a size that covers about half of the steering wheel. The lower lip of the pocket is thus firmly supported by a central hub of the steering wheel (not shown) and by the lateral rim of the wheel.

Figure 5A:
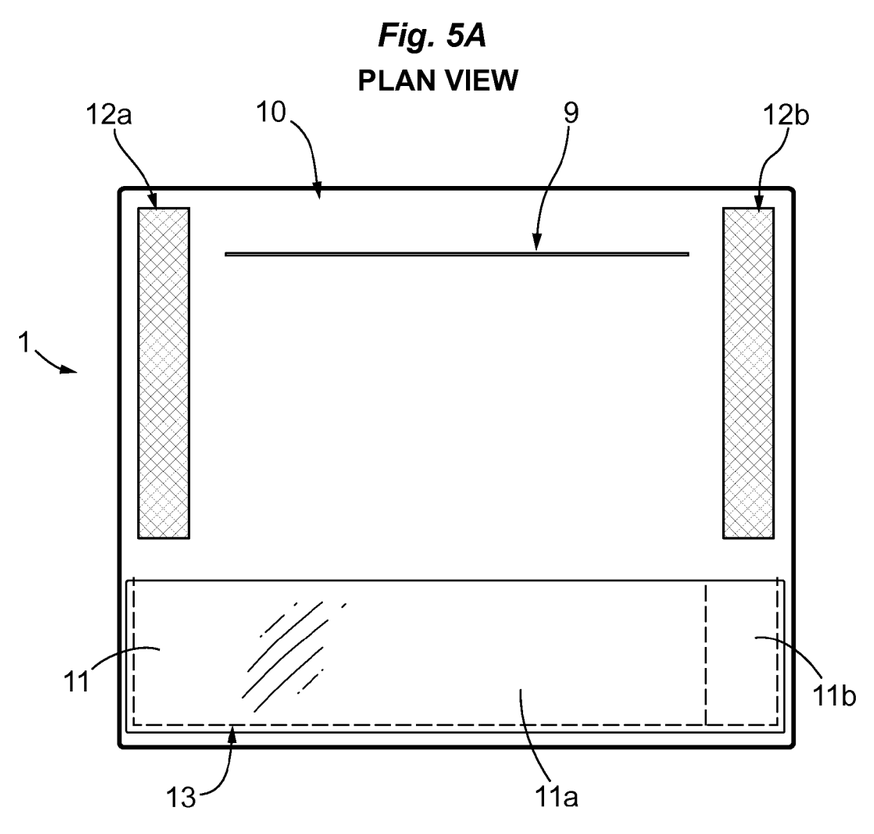
FIGS. 5A, 5B and 5C are plan and elevation views of a first device having a full length apron and clear pocket.
Figure 5B:
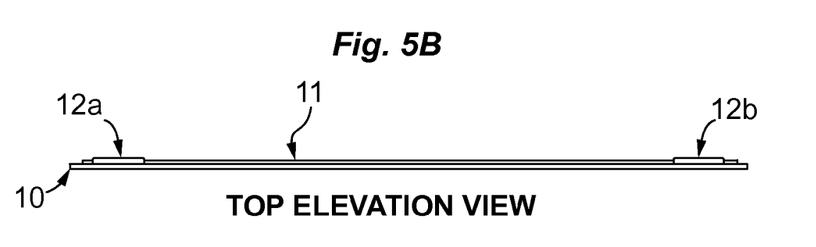
Figure 5C:
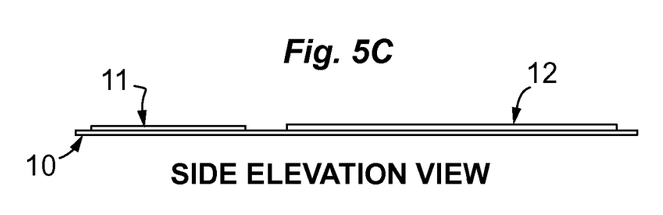

FIGS. 5A, 5B and 5C are plan and elevation views of a first device having a full length apron and clear pocket. Shown is the main body (10), the mounting slit (9) with the relative positions of the clear pocket (11) and fastening strips (12a, 12b). In the side elevation view, the fastening strips are indicated by a raised member (12) extending from the right, which corresponds to the top edge of the device.

Figure 6:
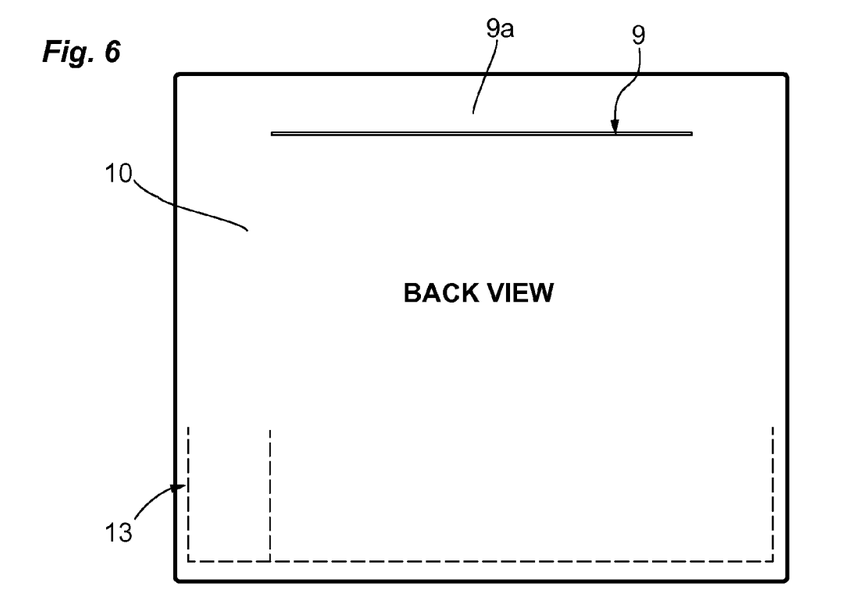
FIG. 6 is a plan view of the back side of the device of FIG. 5A.

FIG. 6 is a back view of the device of FIG. 5A, showing the mounting slit (9) and webbing (9a) formed in the body layer (10) and stitching 13 indicating the approximate placement of the clear pocket at the lower edge on the front surface.

Figure 7:
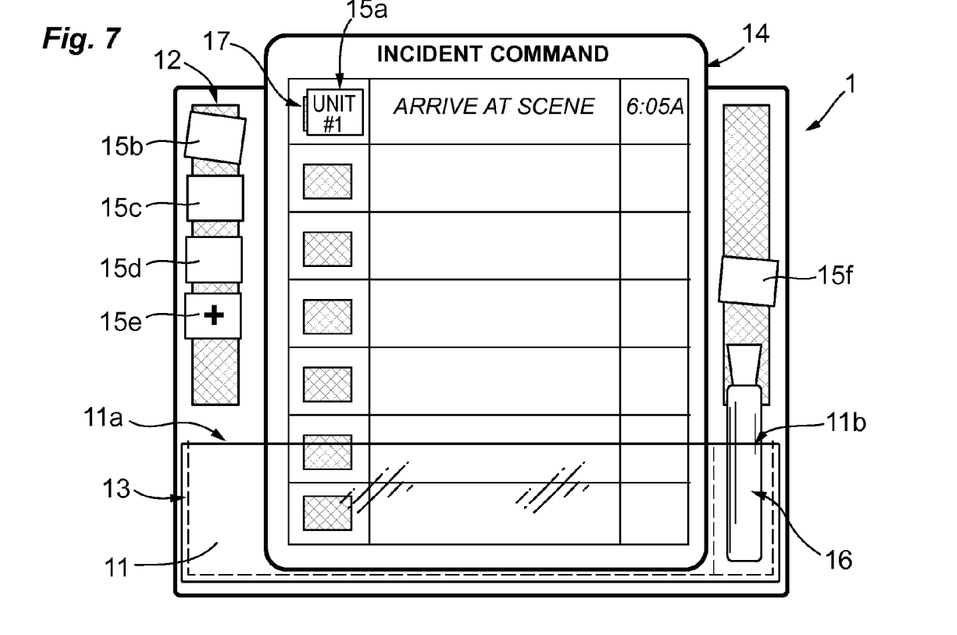
FIG. 7 is a rendering of a device of FIG. 5A in use with an insertable rigid board having features for tracking response to a police or fire emergency, such as used by a fire captain or mobile dispatcher.

FIG. 7 is a rendering of a device (1) termed a "wheel commander". The device essentially as shown in FIG. 5A, is combined with an insertable rigid "command board" having features for tracking a response to a police or fire emergency, such as used by a fire captain or mobile dispatcher.

The rigid board member (14) may be a "dry-erase" board, for example, and may be pre-marked or printed to include helpful information and a grid for organizing information entered by the user with a marker (16) as shown here inserted into a smaller pocket (11b). The command board (14) is dimensioned to fit into the larger pocket (11a) of the device. The pocket (11) and stitching (13) are made of materials that are strong enough to resist movement and weight on the command board and are clear so that the full surface of the board is visible. The pocket is configured so that the command board is supported on the top and bottom rim of the steering wheel, providing firm support. The command board includes sticky patches (17) that may be used to temporarily move rigid "tags" or "tokens" (15a), such as are labeled with tracking information. The sticky patches may be formed of squares of a hook-and-loop fastener system such as VELCRO® or may be formed from a pressure-sensitive adhesive applied to the board and/or to the back of the tokens. Space is also provided to enter reference notes and times if desired.

The command board and steering wheel pocket device may be supplied as a kit including a supply of tokens and colored markers for use by fire or police personnel, or other emergency responders. Additional strips (12) of a fastening material are affixed (shown here contralaterally) on the device near the command board so that other tokens may be positioned for quick access. Other repositionable fastening systems may be used if desired. For example, each token (15a, 15b, 15c, 15d, 15e) may correspond to an available emergency response unit, and token 15f may indicate a unit that is not available. The tokens are then switched as the situation develops. Certain tokens may be pre-labeled, for example with a "+" to indicate an ambulance or medical response vehicle, or with other indicia to indicate certain agencies or rankings. In use, a supervisor parks a command vehicle, mounts the steering wheel pocket as a mobile desk in front of him, and moves the tokens as the emergency develops. The device leaves the commander's hands free to use the radio or make notes that will later go into an after-action report. The command board may be removed from the pocket and erased for re-use or transported to a desk. Multiple incident tracking may be accomplished by providing multiple command boards. If preferred, the device can be mounted to the passenger side dashboard with optional fasteners.

Thus in another embodiment, the invention is a combination of a steering wheel pocket device with a command board, the command board including (i) a rigid marking board dimensioned to be supported in the pocket on the rim of a steering wheel, the board having a writing surface for receiving annotations; (ii) a plurality of tokens, wherein the tokens are repositionably attachable to the strip or strips and to the writing surface; and, (iii) at least one marking implement for making annotations on the marking board. And in use, the invention is a method for coordinating an emergency response from the driver's seat of a vehicle, which comprises steps for (a) providing a kit having the steering wheel pocket device and a command board; (b) mounting the steering wheel pocket device on a steering wheel of a vehicle; (c) inserting the rigid marking board into the pocket of the device, the marking board having a size proportioned to be supported on the rim of a steering wheel when in the pocket and having a writing surface exposed thereon; (d) attaching at least one token of the plurality of tokens to the fastener strips or the writing surface, the at least one token indicating at least one unit responding to an emergency; and, (e) making annotations and repositioning the at least one token as the emergency response develops.

Figure 8A:
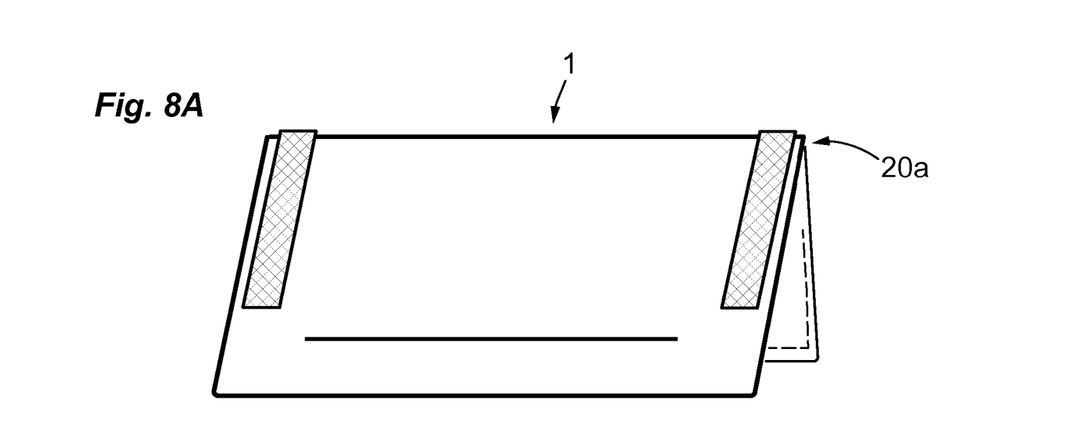
FIGS. 8A, 8B and 8C illustrate a method of folding the pocket device for storage and ready access.
Figure 8B:
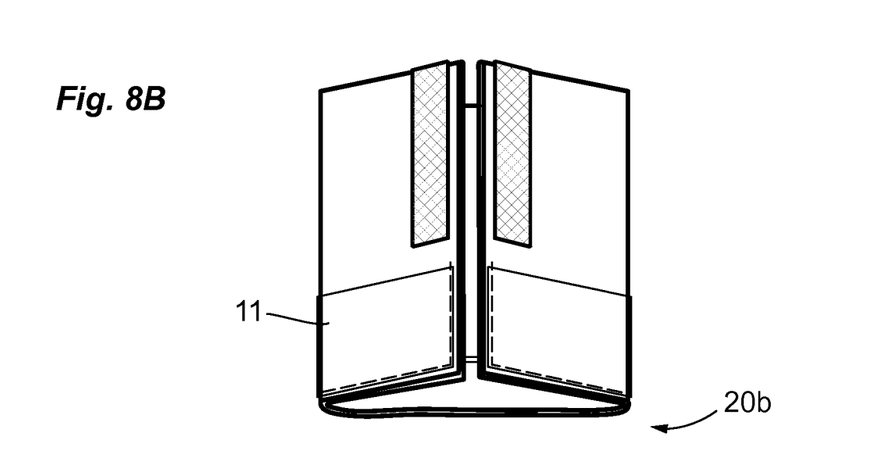
Figure 8C:
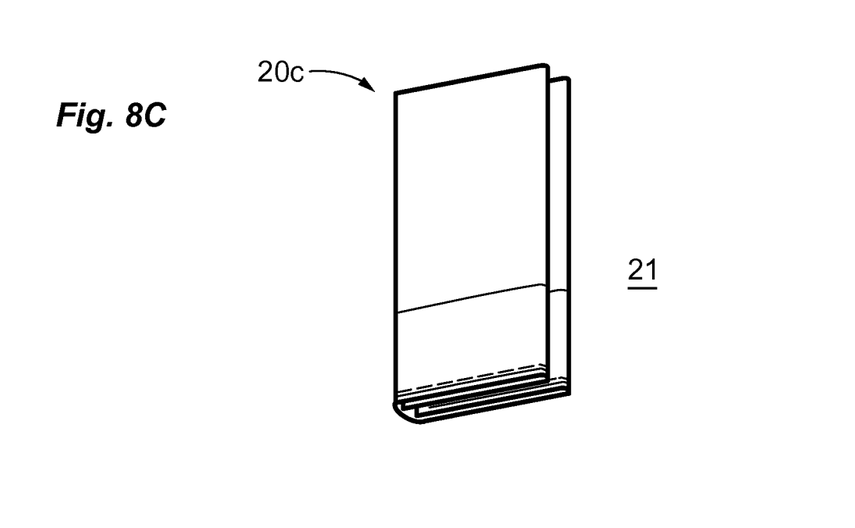

FIGS. 8A, 8B and 8C illustrate a method of folding the pocket device for storage and ready access. As illustrated here, a first fold (20a) is made crosswise to fold the top half of the device against the bottom half. Preferably, the back side of the device is folded against itself. In a second fold (20b), two quarter panels are folded so that the clear pocket (11) is visible as shown. This view shows the ends being folded in toward the middle. The device is then folded onto itself down the middle (20c) so as to form a compact storage configuration (21). This view shows the present invention folded and ready for storage. The folded configuration is small enough to be stored on in a strap or pouch on the front windshield visor of the vehicle, or in a pocket or a purse. There are no similar devices found that will compact to this size. The storage configuration advantageously may also be used in packaging the device for sale.

Figure 9:
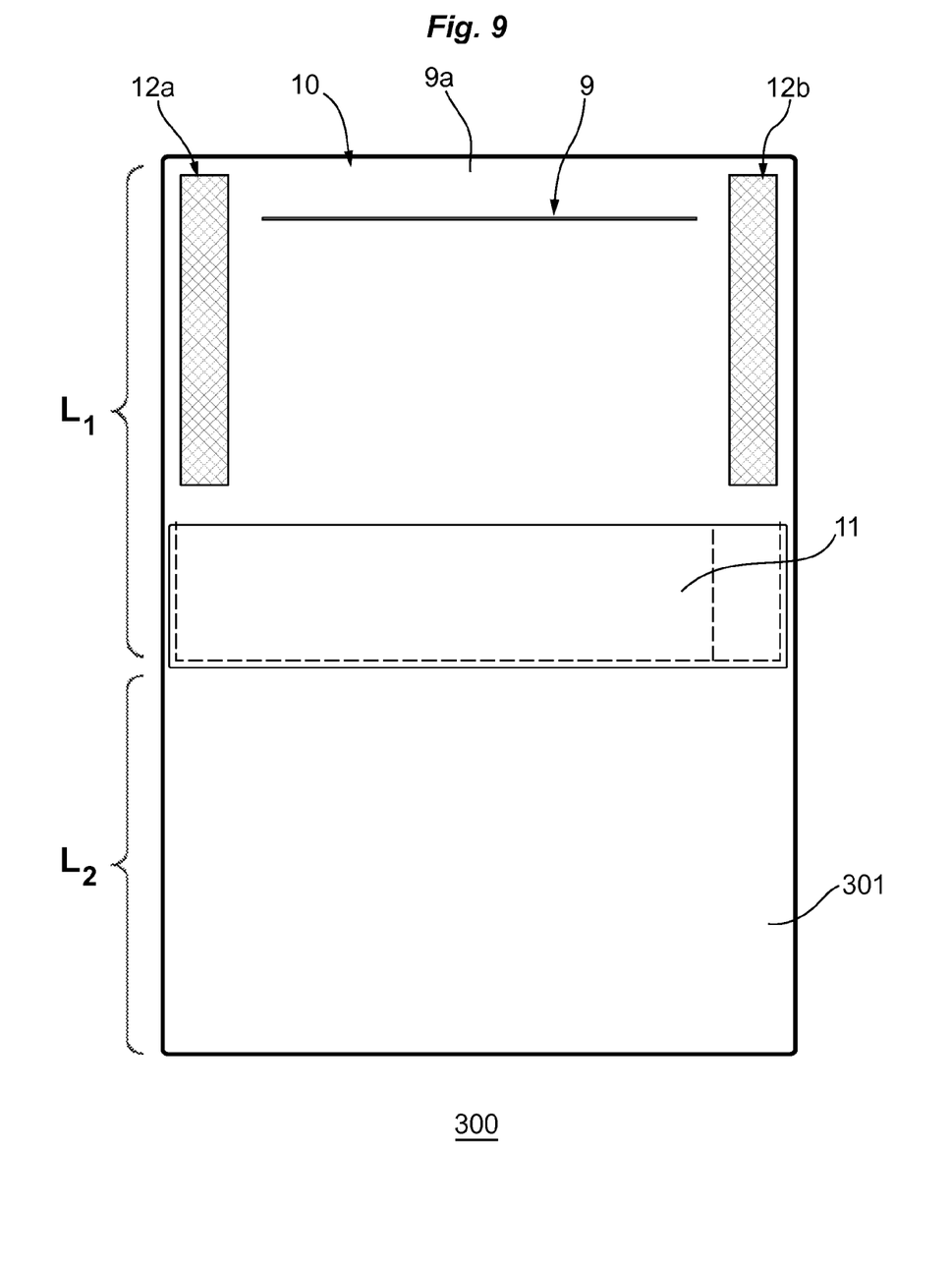
FIG. 9 is a view of a device having an extended apron or "bib".

FIG. 9 illustrates a third exemplary device (300) of the invention, have a bib or "apron" extension (301) formed from a single sheet (10) which serves to protect the user's lap from spills when eating or drinking in the vehicle. The length of the bib ($L_2$) may be proportioned relative to length ($L_1$) and relative to the position of the clear pocket (11) as appropriate for ease of use. Also shown is a mounting slit (9) and support webbing (9a) in the main body sheet (10) and fastening system strips (12a, 12b) for organizing accessories when working from a vehicle. The device (300) may be folded in a storage configuration small enough to be stored in a strap or pouch on the front windshield visor of a vehicle or in a glove compartment, for example.

EXAMPLE

The main body of the device is formed from a sheet of coated vinyl named "Rex Tex" (Rex Pegg Fabrics, Tacoma Wash.). It is heat sealable and water-proof. Specifications are:

| | |
|---|---|
| Finished weight | 18.5 oz. per sq yd |
| Grab Tensile | 325/325 lbs |
| Strip Tensile | 250/200 lbs |
| Trapezoid Tear | 30/30 lbs |
| Tongue Tear | 80/80 lbs |
| Adhesion | 10 lbs per inch |
| Cold Crack | −40 degrees F. |

The clear plastic pocket is made from sheets of "Crystal View" clear vinyl (Perfectfit, Seattle Wash.) with no interleaf. A material having a 0.030 (30 gage) thickness was chosen for its durability and ability to transfer heat away from touch screen devices. Surprisingly, this material permitted normal fingertip operation of a touch screen devices through the transparent sheet forming the pocket.

The thread that is used is #46 Nylon 16 oz thread. Nylon was chosen for its strength, flexibility, and stretch. It has excellent resistance to chemicals, abrasion and sunlight.

Generally rectangular sections of the vinyl backing were first cut to size and a slit was cut about 2 inches from the topmost edge, the slit having a length proportioned to enable the vinyl body to be hung from a standard car or truck steering wheel without slipping off, while leaving sufficient material on either side of the slit to ensure that the lateral edges of the webbing are joined to the lower apron. A strip of the clear vinyl was sewn onto the vinyl body at the lower edge, forming a transparent pocket. Optionally, the pocket is subdivided with additional lines of stitching.

An acrylic adhesive backed hook and loop fastening system was used for affixing accessories to the vinyl backing. Strips of the fastening system such as a VELCRO® fastening system (generally the male component) are glued (or stitched) to the vinyl backing to permit optional attachment of tokens or other items useful in working from a mobile desk in the driver's seat.

INCORPORATION BY REFERENCE

All of the US Patents, US Patent application publications, US Patent applications, foreign patents, foreign patent applications and non-patent publications referred to in this specification and related filings are incorporated herein by reference in their entirety.

SCOPE OF CLAIMS

Having described the invention with reference to the exemplary embodiments, it is to be understood that it is not intended that any limitations or elements describing the exemplary embodiments set forth herein are to be incorporated into the meanings of the patent claims unless such limitations or elements are explicitly recited in a particular claim.

While the above is a complete description of selected, currently preferred embodiments of the present invention, it is possible to practice the invention use various alternatives, modifications, combinations and equivalents. In general, in the following claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited by the disclosure.

I claim:

1. A kit for coordinating an emergency response from the driver's seat of a vehicle, which comprises,
    (a) a steering wheel pocket device comprising:
        (i) a body member formed of a rip-resistant sheet, said body member having a top edge, a bottom edge, a front face, a back face, and two sides, wherein said body member is divided by a steering wheel mounting slit extending from side to side into a support webbing proximate to said top and an apron extending from said slit to said bottom, said support webbing and said apron joining at said sides to enclose said mounting slit, wherein said steering wheel mounting slit is dimensioned to detachably hang the body member on a steering wheel and the pocket is dimensioned to receive on or more objects selected by a user when working in a vehicle;
        (ii) an optically clear sheet member affixed to said front face of said body member at said bottom edge, said said clear sheet member defining a pocket having at least one opening at the top of the pocket;
        (iii) a strip or strips of a fastener system applied at one or more sides of said front face;
    (b) a command board comprising:
        (i) a rigid marking board dimensioned to be supported in said pocket on the rim of a steering wheel, said board having a writing surface for receiving annotations;
        (ii) a plurality of tokens, wherein said tokens are repositionably attachable to said strip or strips and to said writing surface; and,
        (iii) at least one marking implement for making annotations on said marking board.

2. The kit of claim 1, wherein said marking board is provided with a grid permanently displayed thereon.

3. The kit of claim 1, wherein one or more of said tokens are pre-marked with indicia identifying a class of emergency vehicle or an agency.

4. A method for coordinating an emergency response from the driver's seat of a vehicle, which comprises steps for:
    (a) providing a kit of claim 1;
    (b) mounting said steering wheel pocket device on a steering wheel of a vehicle;

(c) inserting said rigid marking board into said pocket of said device, said marking board having a size proportioned to be supported on the rim of a steering wheel when in said pocket and having a writing surface exposed thereon;
(d) attaching at least one token of said plurality of tokens to said fastener strips or said writing surface, said at least one token indicating at least one unit responding to an emergency; and,
(e) making annotations and repositioning said at least one token as an emergency response develops.

\* \* \* \* \*